Patented May 7, 1929.

1,712,297

UNITED STATES PATENT OFFICE.

REINHOLD FICK, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY.

MANUFACTURE OF HYDROCYANIC ACID.

No Drawing. Application filed December 21, 1925, Serial No. 76,870, and in Germany December 19, 1924.

When formamid is heated to about its boiling point namely to about 210° C., it is decomposed mostly to form carbon monoxid and ammonia. By exposing formamid vapors to higher temperature, the speed of the decomposition is considerably increased, and more hydrocyanic acid is formed but not sufficient to allow of an industrial use.

I have now found that formamid is easily decomposed to form hydrocyanic acid and water by heating it rapidly under reduced pressure to temperatures between 400 degrees and 900 degrees centigrade. In this case, hydrocyanic acid is produced with very good yield and even practically completely. The formamid may be sprayed or caused to trickle into a highly heated reaction chamber or better still it may be vaporized under reduced pressure and the vapors exposed to high temperature. It is of advantage though not necessary to carry out the reaction in the presence of dehydrating catalysts suitable or usual for the catalytic dehydration of gaseous or vaporized substances at elevated temperatures, for example alumina, bauxite, titanium oxid, thoria, iron oxids, silica gel, salts of difficultly volatile acids such as silicate and phosphate of aluminium, alkali metal silicates, borates and aluminates and so on which all may be used alone or in mixture with each other, or on suitable supports as for example pumice stone, asbestos, active charcoal and the like.

Ammonium formate or mixtures of it with formamid may be used in the same manner instead of formamid alone though generally with less excellent result. The term ammonia-formic acid compound is to be understood to comprise all such substances or mixtures.

The hydrocyanic acid is rapidly cooled and obtained with good yields; it may be utilized in any desired manner either in the gaseous state or as a liquid or absorbed by means of active charcoal or of alkalies or other absorbing media.

The following examples will further illustrate my invention which, however, is not limited to these examples.

Example 1.

Formamid is vaporized at a temperature of 120° to 170° C. under a pressure of 20 to 30 millimetres of mercury, and the vapors are passed through a tube filled with finely granulated pumice stone at 600° to 650° C., the tube being kept at the same reduced pressure. The resulting vapors of hydrocyanic acid and water are led into a cooler as rapidly as possible. More than 90 per cent of the theoretical yield of hydrocyanic acid are obtained. By using pumice stone impregnated with an alkali metal silicate or phosphate or with a mixture of these substances with other dehydrating catalysts, still higher yields are obtained.

Example 2.

Formamid vapor is passed through a tube filled with grains of pumice stone impregnated with thoria and heated to a temperature of from 700° to 800° C. under a reduced pressure of about 50–100 millimetres of mercury. Hydrocyanic acid is formed in a nearly theoretical yield.

Example 3.

Formamid vapor is passed under reduced pressure of about between 50 and 100 millimetres over previously heated and granulated aluminium phosphate heated to about 600 degrees centigrade. Hydrocyanic acid is obtained with a yield of 96 per cent of the theoretical one.

When employing sodium phosphate or other salts of difficultly volatile acids, such as for example alkali metal silicates, borates and the like, instead of aluminium phosphate, similar yields of hydrocyanic acid are obtained.

When using ammonium formate or mixtures or formamid with ammonium formate, the process may be carried out in a similar manner to that described in the above examples.

I claim:

1. The process of manufacturing hydrocyanic acid which comprises rapidly heating an ammonia-formic acid compound under reduced pressure to a temperature of at least 400° C. in such a manner that the vapors and gases are not heated substantially longer than is necessary for obtaining the desired temperature.

2. The process of manufacturing hydrocyanic acid which comprises rapidly heating an ammonia-formic acid compound under reduced pressure to a temperature between 400 degrees and 900 degrees centigrade in such a manner that the vapors and gases are not heated substantially longer than is necessary for obtaining the desired temperature.

3. The process of manufacturing hydrocyanic acid which comprises rapidly heating an ammonia-formic acid compound under reduced pressure to a temperature between 400 degrees and 900 degrees centigrade in the presence of a dehydrating catalyst in such a manner that the vapors and gases are not heated substantially longer than is necessary for obtaining the desired temperature.

In testimony whereof I have hereunto set my hand.

REINHOLD FICK.